Figure 3:
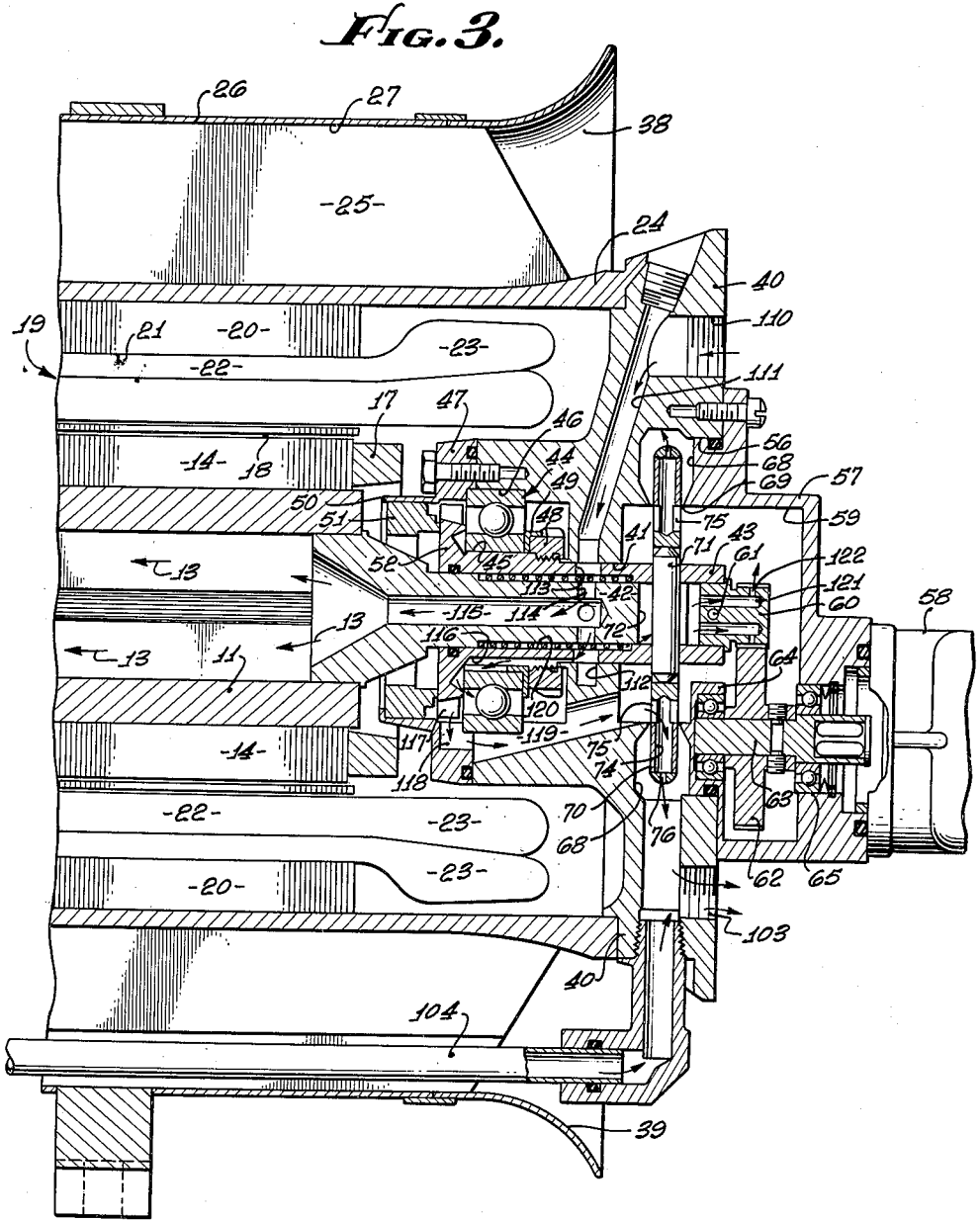

Oct. 31, 1961 R. N. RIGNEY 3,007,065
FLUID COOLED MOTOR
Filed March 23, 1959 3 Sheets-Sheet 1
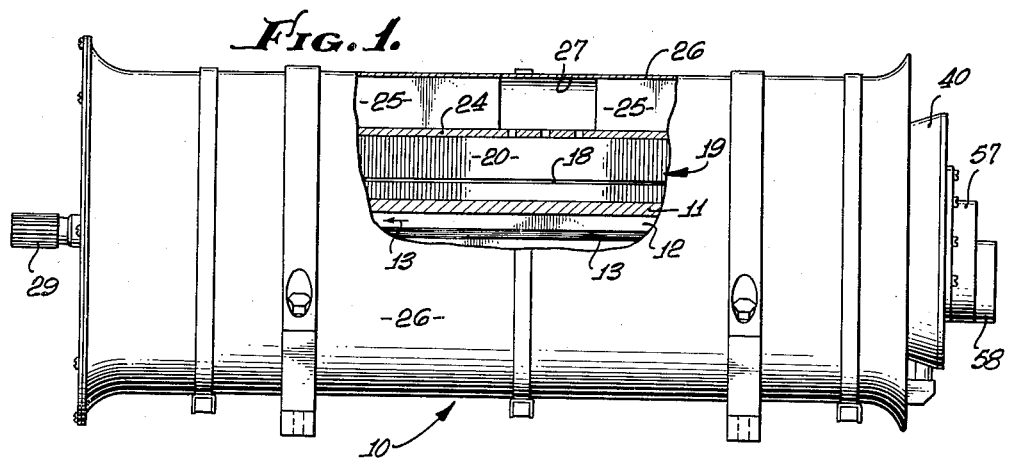
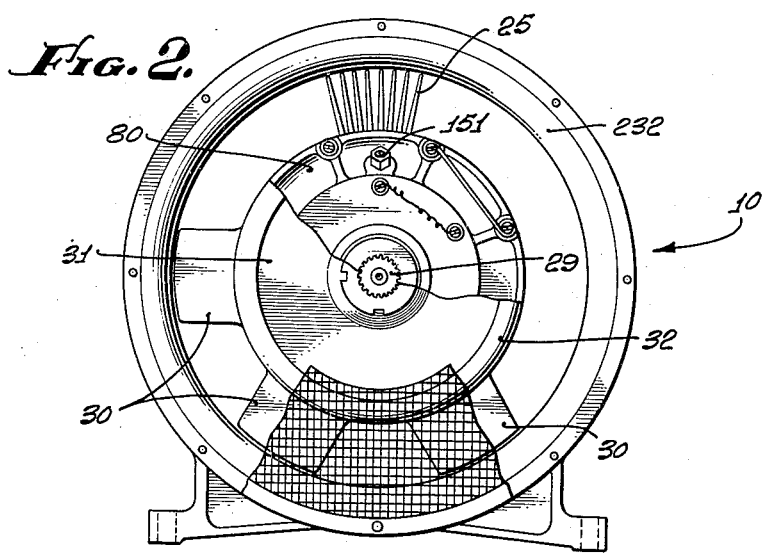
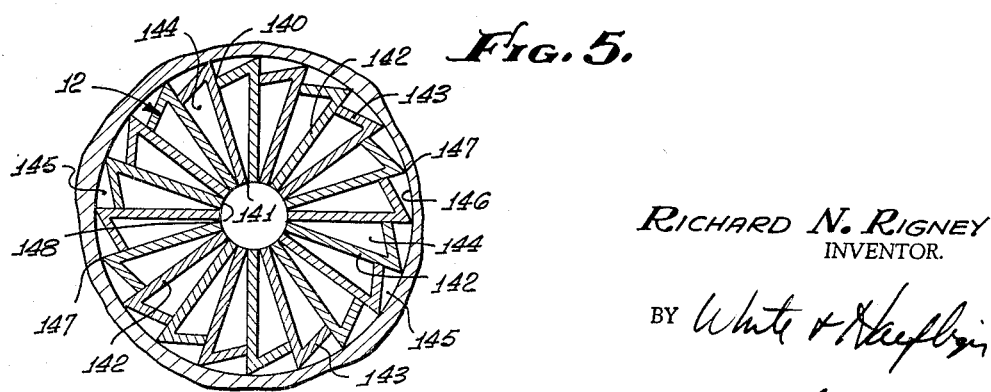
RICHARD N. RIGNEY
INVENTOR.
BY White & Haefling
ATTORNEYS.

Oct. 31, 1961   R. N. RIGNEY   3,007,065
FLUID COOLED MOTOR
Filed March 23, 1959   3 Sheets-Sheet 2

RICHARD N. RIGNEY
INVENTOR.

BY White & Haefly
ATTORNEYS.

RICHARD N. RIGNEY
INVENTOR.

BY White & Haefligr
ATTORNEYS.

United States Patent Office 3,007,065
Patented Oct. 31, 1961

3,007,065
FLUID COOLED MOTOR
Richard N. Rigney, Anaheim, Calif., assignor to The Task Corporation, Anaheim, Calif., a corporation of California
Filed Mar. 23, 1959, Ser. No. 801,085
11 Claims. (Cl. 310—54)

This invention relates generally to the cooling of electrical machinery, and more particularly has to do with the cooling of electrical motors, particularly induction motors, using both air and oil as fluid coolants. The invention is most particularly concerned with the cooling of an induction motor of high rated power output in relation to its weight, wherein the problem of cooling becomes critical.

In the presently to be described motor of the induction type having coaxial rotor and stator assemblies carried within a housing, the production of heat during motor operation is about equally divided between the rotor and stator assemblies. This presents the problem of continuously removing heat from, or cooling, the rotor assembly which is relatively inaccessible due to its confinement by the stator assembly. At the same time, the stator assembly itself must be continuously cooled. The solution to this problem according to the present invention is realized through the separate circulation of liquid and gaseous coolants respectively through the rotor assembly and over the stator assembly in cooling relation therewith during operation of the machine. In particular, and referring first to cooling of the rotor assembly, the latter is provided with a tubular rotor shaft through which a liquid coolant such as oil is circulated to remove heat from the rotor core laminations mounted on the shaft, a series of axially extending vanes being located within the tubular rotor shaft for absorbing heat from the shaft and for transferring same to the oil.

While different types of bearings are usable for supporting the shaft to rotate within the motor housing, the invention particularly contemplates the use of anti-friction type bearings lubricated by the circulating oil, together with pumping means acting to draw oil away from the anti-friction bearings to keep them from being submerged in oil during motor operation. The reason for preventing oil submergence is to keep them from heating the cooling oil at the high operational speeds of the motor, and thus the pumps are such as to maintain the bearings operating preferably in oil mist. As will be seen, the design of the motor is such as to provide passages for circulating the oil coolant not only through the motor shaft but also in and around the bearings and through the pumps, all in such manner as to achieve the particularly desirable end results necessary to successful operation of a high speed induction motor of relatively large power output in relation to its weight. For example, a prototype motor of the type to be described weighs 187 pounds and delivers 240 horsepower at 11,700 r.p.m.

Also in accordance with the invention, the stator is cooled preferably by circulation of air over the housing surrounding the stator and for this purpose the housing is enclosed by a shroud forming with the housing an axially extending annular air passage containing axially elongated vanes or fins for transferring heat from the housing on which the fins are mounted to the circulating air. Air circulation through the passage is maintained by operation of a shaft driven auxiliary blower or fan at one end of the motor unit as will be described.

Figure 4:
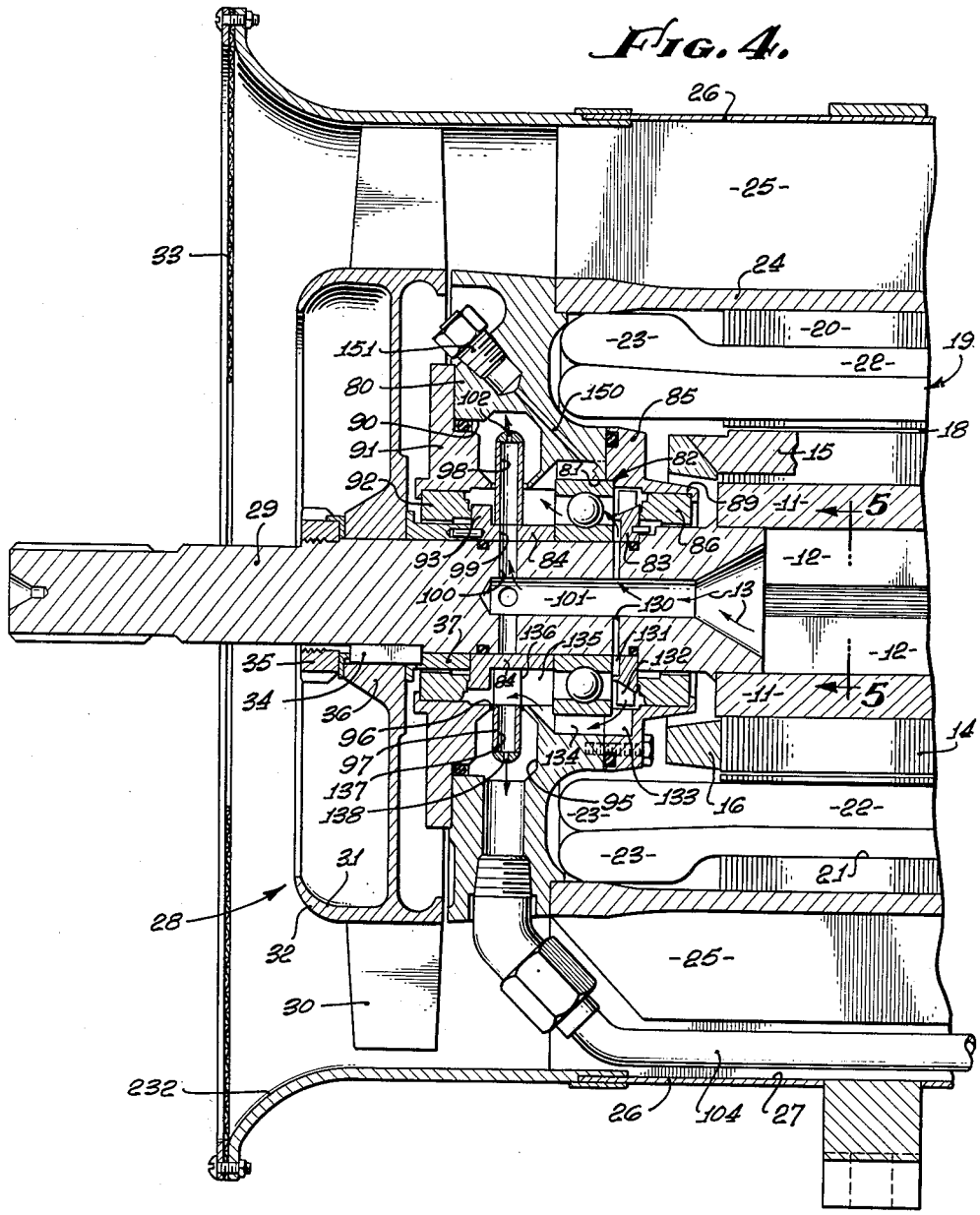

These and other objects of the invention, as well as the details of an illustrative embodiment, will be more fully understood from the following detailed description of the drawings, in which:

FIG. 1 is a partly broken away overall side elevation of the exterior of the motor;
FIG. 2 is a forward end elevation of the motor, partly broken away;
FIG. 3 is an enlarged elevation taken in section through the rearward end portion of the motor unit;
FIG. 4 is an enlarged side elevation taken in section through the forward end portion of the motor unit; and
FIG. 5 is an enlarged section taken on lines 5—5 of FIG. 4.

Referring to FIGS. 1, 3, 4 and 5, particularly to the construction of the motor unit 10, it includes midway between its opposite ends a tubular rotor shaft 11 containing a plurality of circularly spaced, axially elongated vanes or fins 12 between which cooling oil circulates in flowing axially through the tubular shaft as indicated by the arrows 13. The shaft 11 mounts the rotor iron core laminations 14 extending in planes perpendicular to the shaft axis, a series of circularly spaced axially directed parallel conductor bars 15 being received or sunk in the core laminations, and forming the common squirrel cage associated with induction motors. These bars are shorted at their opposite ends by conductor rings 16 and 17 typically made of copper, as are the bars.

Spaced outwardly from the rotor assembly by a small gap indicated at 18 is a stator assembly 19 including an elongated laminar core 20 containing openings 21, shown in FIGS. 3 and 4, through which the stator windings 22 extend in an axial direction, the windings projecting from the core 20 at opposite ends thereof as indicated at 23.

The stator assembly is in turn enclosed within a cylindrical housing 24 closely received about the stator laminations, so that heat developed therein during motor operation may rapidly flow or be conducted outwardly through the housing wall to a plurality of vanes or fins 25 mounted on and extending radially from the housing. These vanes also extend axially, and are in turn surrounded by and mount a shroud 26 which forms with the housing 24 an axially elongated cylindrical and annular air passage 27 through which air is circulated over the vanes 25, receiving heat therefrom. Air circulation is maintained by a rotary blower assembly 28 shown in FIG. 4 as mounted on the forward stub end 29 of the shaft 11, the assembly including blower vanes 30 forwardly spaced from the stationary vanes 25. As viewed in FIG. 4, the ring shaped body 31 of the blower assembly is belled inwardly at 32, whereas the shroud 26 is belled outwardly at its forward end 232, so as to aerodynamically guide the air received through screen 33 into the blower vanes 30 with minimum turbulence. Also as seen in FIG. 4, body 31 is keyed to the stub shaft 29 at 34, a nut 35 threaded on the shaft holding the body hub 36 against a spacer 37 on the stub shaft. Air exits through passage 27 via the annular port 38, the rearward end of the shroud being belled outwardly at 39 to aerodynamically guide the heated air from the passage 27.

Referring now to FIG. 3, the rearward end of the housing 24 is closed by a rear bearing support body or plug 40 received within the housing end, body 40 containing a central bore 41 through which the rearward stub portion 42 of shaft 11 projects along with a sleeve 43 mounted on the shaft stub portion 42. The shaft sleeve 43 is supported by the body 40 through the ballbearing assembly 44, including an inner race carried by the sleeve at 45 and an outer race received in a counterbore 46 of the body 40.

The bearing assembly 44 is held between a retainer ring 47 abutting the bearing outer race, and a nut 48 threaded on the sleeve 43, a washer 49 being held against the side of the outer race of the bearing assembly 44 by the nut. As shown in FIG. 3, the retainer ring 47 includes a flange 50 receiving annular seal 51 bearing against a flanged portion 52 of the sleeve 43 to seal off between the retainer ring 47 and the sleeve 43, for purposes to be described.

Held against the rearward face of the body 40 and received within the counterbore 56 thereof is a cap 57 mounting a tachometer generator unit 58 to be driven by the rotor stub shaft 42 through the sleeve 43. The cap contains a bore 59 into which the rearward end of the sleeve 43 projects. Drive is transmitted to the generator through a pinion 60, pinned to the sleeve 43 at 61, and a gear 62 meshing with the pinion and mounted on the tachometer drive sleeve 63, which is bearing supported at 64 and 65, as shown.

The cap 57 and the body 40 together form an annular chamber 68 having an annular entrance 69 through which projects a disk shaped pump impeller 70 which is carried by the sleeve 43 and locked thereto by a pin 71. The latter is received endwise into a slot 72 milled into the end of the stub shaft 42 so as to key the stub shaft and the sleeve 43 together and also allow relative axial play therebetween. As viewed in FIG. 3 the impeller 70 has radial passages 74, opposite side inlets 75 to those passages, and radial outlet 76 from the passages 74, through which cooling oil circulates from chamber 59 to chamber 68, as will be described.

Referring to the forward end portion of the motor unit, as viewed in FIG. 4 it includes a forward bearing support body or plug 80 received in the forward open end of the housing 24. The body 80 contains a bore 81 through which the tub shaft 29 projects forwardly, the shaft being supported for rotation by the ball bearing assembly 82, including an outer race received in the body bore 81 and an inner race carried by the stub shaft. The latter also carries a slinger ring 83, to the rear or rightward of the bearing assembly, and a sleeve 84 to the left of the bearing inner race and abutting the spacer 37. The bearing assembly is retained between the sleeve 84 and a retainer ring 85 abutting the bearing outer race and connected to body 80. A seal ring 86 is held against the slinger ring 83 by a flanged portion 87 of the retainer ring 85 for sealing off therebetween.

Received against the forward face of the body 80 and projecting within the counterbore 90 thereof is a cap or forward oil seal retainer 91 acting to retain an oil seal 92 in abutment with a flanged portion 93 of the sleeve 84 for sealing off between the sleeve and the cap 91. The latter forms with the body 80 an annular chamber 95 having a ring shaped entrance 96 through which projects a disk shaped pump impeller 97 as shown.

The pump impeller is annular and mounted upon the sleeve 84, with radial passages 98, 99 and 100 in the impeller, sleeve, and stub shaft in radial registration for receiving coolant oil from the reduced bore 101 in the stub shaft. Oil enters this bore from the tubular shaft 11 as indicated by the arrows. Oil exits from the circularly spaced impeller passages 98 through small peripheral outlets 102 into the annular chamber 95 for return to an outlet 103 from the motor unit shown in FIG. 3, a line 104 extending through the air passage 27 connecting chamber 95 with the outlet 103.

Turning back to FIG. 3, cooling oil is fed to the motor unit through an inlet 110 in the body 40, and passes through a drilled passage 111 into an annular passage 112 in the body 40 directly surrounding the sleeve 43 and several radial passages 113 therein. The main portion of the oil then passes through the passages 113 and the radial inlet passages 114 in the stub shaft 42 into a reduced bore 115 in the latter for circulation through the tubular rotor shaft 11 in cooling relation with the vanes 12. Some of the oil in passages 112 passes through a circularly spaced series of passages 116 milled in the periphery of sleeve 43, past the nut 48 and washer 49 and around to the forward side of the bearing inner race. This oil is then thrown outwardly and back toward the balls of the bearing assembly 44 by the slinger flange 52 of the sleeve 43, as indicated by the arrows in the lower half of FIG. 3.

Circularly spaced notches 117 cut in the slinger flange 52 then act to draw oil outwardly from the bearing by centrifugal impeller action, the oil being circulated around the outer race of the bearing in the direction shown by the arrows through a series of notch passages 118 formed in the retainer 47. The oil is then guided through passage 119 in the body 40 for entrance into the impeller 70 through the inlets 75 at the left or forward face thereof. The rotating impeller continuously throws oil outwardly through passages 76 and 68 to the outlet 103, and in so doing acts to scavenge oil from the bearing 44, keeping it from being submerged in the oil which would otherwise become heated at high motor speeds. Thus the bearing assembly operates in an oil mist, as is most desirable.

A small amount of oil leaks from the radial passage formed between the periphery of the stub shaft 42 and the counterbore 120 in sleeve 43 to the axial slot 72 milled in the end of the shaft 42, and then through ports 121 and 122 in the pinion 60 to lubricate the pinion and gear 62. This oil is returned to the impeller inlets 75 at the rightward or rear face thereof for subsequent delivery to the outlet 103.

Turning now to FIG. 4, while the main delivery of oil from the tubular rotor shaft is to the impeller through passages 101, 100 and 99, some of the oil is thrown outwardly through smaller radial ports 130 in the stub shaft 29. These ports register with circularly spaced ports 131 in the slinger ring 83, which deliver the oil outwardly and deflect it against the bearing assembly 82. The oil is then drawn outwardly away from the bearing balls and the outer race of the bearing by the impeller action of the slinger ring, which has circularly spaced notches 132 milled therein, through which the oil is drawn upon rotation of the slinger ring. After passing through notches 133 milled in the retainer 85, the lubricating oil passes around the outside of the bearing outer race and is guided through passages 134 in the body 80 toward the annular chamber 135 between the impeller 97 and the bearing passages 134 being vented to atmosphere at 150 and 151. Oil also passes directly into chamber 135 from the bearing.

The impeller has a series of side openings 136 facing the chamber 135 for drawing oil into additional impeller radial passages 137, the oil then being thrown outwardly through impeller outlets 138. Thus, the action of the impeller keeps the bearing assembly from submergence in oil so that the bearing may operate in an oil mist as is most desirable.

Reference to FIG. 5 will show the construction of the vanes 12 inserted within the tubular shaft 11 and held in assembled relation by interengagement with one another at points 140 and 141. These vanes extend radially at 142 and then project laterally at 143 to engage the sides of the adjacent vanes facing the projections 143, thereby forming the sub-passages 144 and 145 through which the oil circulates. Heat is transferred from the rotor assembly directly to the oil in sub-passages 145 and indirectly to the oil in sub-passages 144 through the vanes which contact the bore 146 of the tubular shaft 11 at points 147. The inner edges of the vanes engage one another at points 141 preventing radially inwardly collapsing thereof and forming a central sub-passage 148 through which cooling oil also circulates.

I claim:

1. A fluid cooled electrical machine, comprising apparatus including a housing and rotor and stator assemblies within the housing, said rotor assembly including a rotor shaft, bearings at opposite ends of the rotor and stator assemblies supporting the shaft for rotation, said apparatus containing passages communicating with the interior of the rotor assembly and extending over the stator assembly for circulating a first fluid coolant in cooling relation with the rotor and to lubricate the bearings and for separately circulating a second fluid coolant over said stator assembly in cooling relation therewith during operation of said machine, and pump means having outlets out of direct communication with the bearings and having intakes in the path of first fluid coolant access to the bearings for drawing first fluid coolant away from the bearings to keep the bearings operating locally in first fluid coolant mist during machine operation, the passages providing relatively restricted access for coolant flow to the bearings and relatively unrestricted access for coolant flow from the bearings to said intakes.

2. A fluid cooled electrical machine, comprising apparatus including a housing and rotor and stator assemblies within the housing, said rotor assembly including a tubular rotor shaft, bearings at opposite ends of the rotor and stator assemblies supporting the shaft for rotation, said apparatus containing passages communicating with the interior of the rotor assembly and extending over the stator assembly for circulating a liquid coolant through said shaft in cooling relation with the rotor and to lubricate the bearings and for separately circulating a gaseous coolant over said stator assembly in cooling relation therewith during operation of said machine, pump means having outlets out of direct communication with the bearings and having intakes in the path of liquid coolant access to the bearings for drawing said liquid coolant away from the bearings to keep the bearings operating locally in liquid coolant mist during machine operation, the passages providing relatively restricted access for coolant flow to the bearings and relatively unrestricted access for coolant flow from the bearings to said intakes, and vanes carried within said tubular rotor shaft for transferring heat from the rotor to said liquid circulating through the shaft.

3. A fluid cooled electrical machine, comprising apparatus including a housing and rotor and stator assemblies within the housing, said rotor assembly including a tubular rotor shaft, bearings at opposite ends of the rotor and stator assemblies supporting the shaft for rotation, said apparatus containing passages communicating with the interior of the rotor assembly and extending over the stator assembly for circulating a liquid coolant through said shaft in cooling relation with the rotor and to lubricate the bearings and for separately circulating a gaseous coolant over said stator assembly in cooling relation therewith during opeartion of said machine, and pump means having outlets out of direct communication with the bearings and having intakes in the path of liquid coolant access to the bearings for drawing liquid coolant away from the bearings to keep the bearings operating locally in liquid coolant mist during machine operation, the passages providing relatively restricted access for coolant flow to the bearings and relatively unrestricted access for coolant flow from the bearings to said intakes, said apparatus including a shroud outside the housing and forming therewith said gas circulation passage, and vanes within said gas circulation passage and mounted on the housing for transferring heat from the stator to gas circulating through said gas passage.

4. A fluid cooled electrical motor, comprising apparatus including a cylindrical housing and coaxial rotor and stator assemblies within the housing, said rotor assembly including a tubular shaft, anti-friction type bearings at opposite ends of the rotor and stator assemblies supporting the shaft for rotation, said apparatus containing passages at opposite ends of the rotor and stator assemblies communicating with the bearings and the shaft interior for circulating oil therethrough in cooling relation with the rotor and to lubricate the bearings, pump means having outlets out of direct communication with the bearings and having intakes in the path of circulating oil access to the bearings for drawing oil away from the bearings to keep the bearings operating locally in oil mist during motor operation, the passages providing relatively restricted access for oil flow to the bearings and relatively unrestricted access for oil flow from the bearings to said intakes, and said apparatus containing another passage extending over the housing for separately circulating air thereover in cooling relation with the stator during operation of the motor.

5. The invention as defined in claim 4 including a plurality of circularly arranged vanes extending axially within the tubular rotor shaft for transferring heat from the rotor to the circulating oil.

6. The invention as defined in claim 5 comprising like vanes each of which extends substantially radially and includes a projection at one side thereof terminating at the side of the adjacent radial vane facing said projection.

7. The invention as defined in claim 4 in which said pump means include rotary impellers at opposite ends of the rotor and stator assemblies.

8. The invention as defined in claim 7 in which said apparatus has oil inlet and outlet ports at one end of the rotor and stator assemblies, and including a line extending within said air passage and communicating with the pump impeller discharges and said oil outlet port.

9. The invention as defined in claim 4 in which said apparatus includes a cylindrical shroud surrounding the housing and forming therewith an annular, axially extending air passage having opposite open ends, and including an axial type blower rotatable by said shaft in the path of said air circulation for circulating air axially through said air passage.

10. The invention as defined in claim 9 including a plurality of circularly spaced vanes extending axially within said air passage mounted in the housing for transferring heat from the stator to air circulating through said air passage.

11. A fluid cooled high speed electrical machine, comprising apparatus including a housing and rotor and stator assemblies within the housing, said rotor assembly including a rotor shaft, bearings supporting the shaft for rotation, said apparatus containing passages communicating with the rotor assembly and bearings for circulating liquid coolant in cooling relation with the rotor assembly and to lubricate the bearings during high speed operation of the machine, and pump means having an outlet out of direct communication with the bearings and having an intake in the path of coolant access to the bearings for drawing coolant away from the bearings to keep the bearings operating locally in liquid coolant mist during machine operation, the passages providing relatively restricted access for coolant flow to the bearings and relatively unrestricted access for coolant flow from the bearings to said intake.

References Cited in the file of this patent

UNITED STATES PATENTS

| 2,321,126 | Breuer | June 8, 1943 |
| 2,590,855 | Gaylord | Apr. 1, 1952 |
| 2,662,195 | Fisher et al. | Dec. 8, 1953 |

FOREIGN PATENTS

| 108,223 | Switzerland | Jan. 2, 1925 |
| 243,258 | Italy | Apr. 2, 1926 |